United States Patent [19]

Norman et al.

[11] Patent Number: 5,636,701

[45] Date of Patent: Jun. 10, 1997

[54] BATTERY TRAY ASSEMBLY

[75] Inventors: Dale Norman, Troy; Prem C. Gupta, Bloomfield Hills; Gary K. Wade, Rochester Hills; Thomas G. Johns, Plymouth; Michael J. Dumas, Clarkston; Donald R. Neumann, Southfield, all of Mich.

[73] Assignee: Chrysler Corporation, Auburn Hills, Mich.

[21] Appl. No.: 283,008

[22] Filed: Jul. 29, 1994

[51] Int. Cl.⁶ .................................................. B60R 16/04
[52] U.S. Cl. ............................................................ 180/68.5
[58] Field of Search ............................... 180/68.1, 68.2, 180/68.3, 68.4, 68.5, 175, 176, 177, 170

[56] References Cited

U.S. PATENT DOCUMENTS

| | | | |
|---|---|---|---|
| 3,088,538 | 5/1963 | Brennan et al. | 180/170 |
| 4,065,170 | 12/1977 | Fabian et al. | 296/37 |
| 4,126,734 | 11/1978 | Walters | 180/68.5 |
| 4,345,663 | 8/1982 | Shields | 180/177 |
| 4,967,327 | 10/1990 | Abujudom, II et al. | 180/68.26 |
| 5,086,860 | 2/1992 | Francis et al. | 180/68.5 |
| 5,228,531 | 7/1993 | Patterson et al. | 180/68.5 |
| 5,255,782 | 10/1993 | Carroll, Jr. | 206/333 |
| 5,273,604 | 12/1993 | Garcia | 156/187 |
| 5,443,926 | 8/1995 | Holland et al. | 180/68.5 |

FOREIGN PATENT DOCUMENTS

| | | | |
|---|---|---|---|
| 738985 | 10/1955 | United Kingdom | 180/68.5 |

*Primary Examiner*—Richard M. Camby
*Assistant Examiner*—Frank Vanaman
*Attorney, Agent, or Firm*—Margaret A. Dobrowitsky

[57] ABSTRACT

A battery tray assembly is provided having a vacuum reservoir enclosure molded onto the lower part of a plastic battery tray structure to form an air-tight vacuum reservoir enclosure having a common wall with the battery tray. A vacuum can be created within the vacuum reservoir enclosure utilizing a check valve in communication with the intake manifold of the vehicle engine.

4 Claims, 3 Drawing Sheets

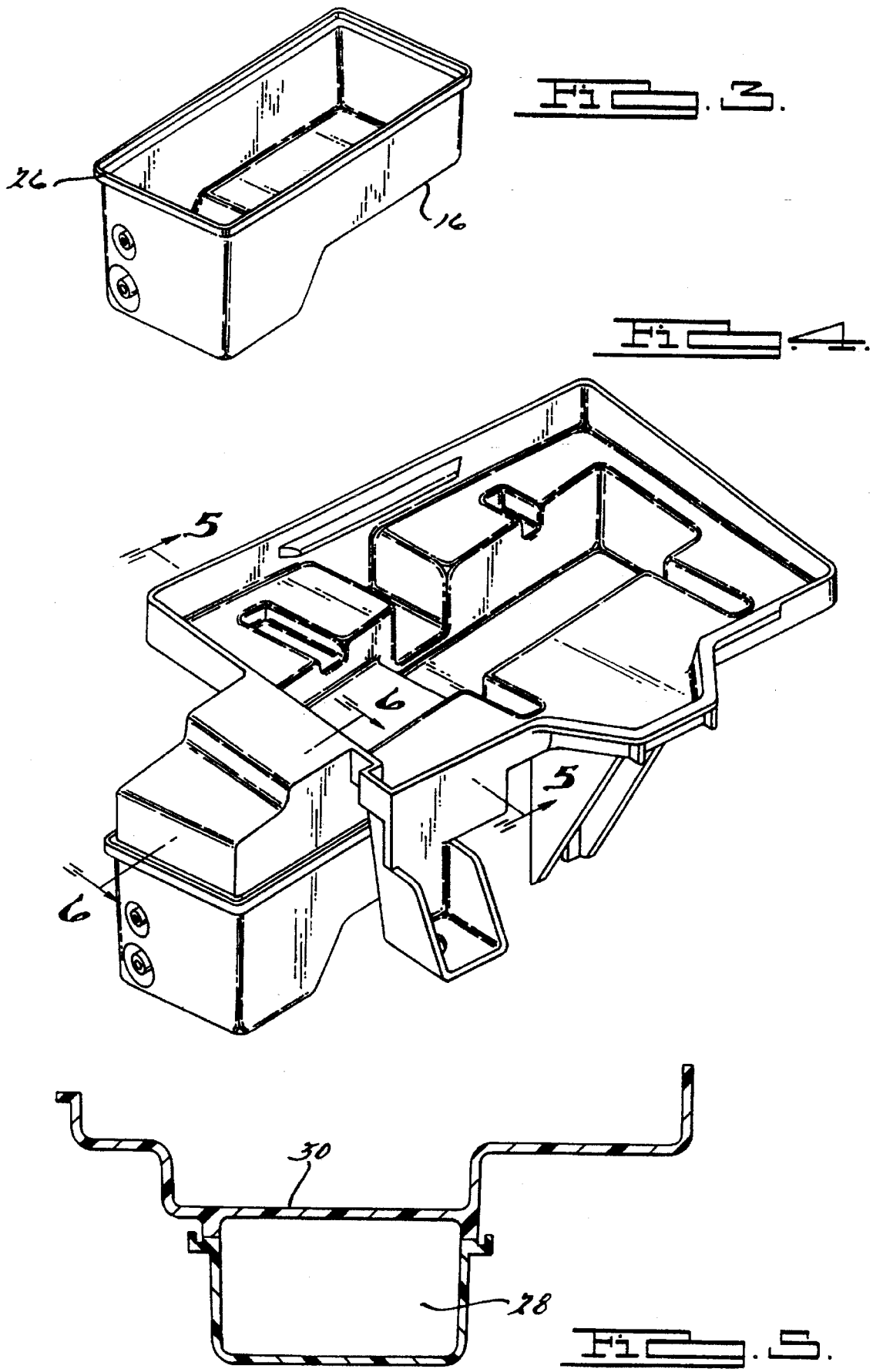

BATTERY TRAY ASSEMBLY

TECHNICAL FIELD

The present invention relates to a battery tray structure having an integrated speed control servo vacuum reservoir enclosure. More particularly, the present invention relates to a battery tray assembly in which the vacuum reservoir enclosure is molded onto the lower part of the battery tray structure such that the vacuum reservoir enclosure has a common wall with the battery tray.

BACKGROUND OF THE INVENTION

Heretofore, the speed control servo vacuum bottle used in the regulation of the vehicle cruise control system has been mounted as a separate component on a bracket inside the engine compartment using conventional mounting means such as bracket screws or other fasteners. The present invention integrates a speed control servo vacuum reservoir into the battery tray structure to form a single battery tray assembly having increased structural integrity over prior battery tray designs and which provides an air-tight enclosure in which a consistent vacuum reference can be maintained.

Integration of components other than the speed control servo vacuum bottle into the battery tray structure has been disclosed in prior United States patents. For example, U.S. Pat. No. 4,976,327 issued Dec. 1, 1990 to Abujudom, II et al. discloses a plastic battery enclosure for an automotive vehicle whose structure incorporates a windshield washer reservoir, a radiator overflow reservoir, and an electrical component compartment. The '327 scheme attempts to insulate the vehicle battery from the engine's heat by establishing an air-flow path around the outside of the battery compartment. This air-flow path incorporates walls of the aforementioned reservoirs and compartments into a conduit system that encircles the battery. However, the prior art fails to disclose a battery tray design which integrates a speed control vacuum reservoir into the battery tray structure.

Therefore, it is the object of the present invention to provide a battery tray assembly in which a speed control vacuum reservoir is integrated into the battery tray to produce an assembly structure having fewer component parts but increased strength over prior battery trays and which provides the air-tight enclosure needed to maintain a consistent vacuum reference for operation of the speed control system.

A further object of the invention is to provide a single battery tray assembly whose overall dimensions require less engine compartment space and which takes less time to assemble and install on the vehicle than any prior battery tray and vacuum bottle arrangement.

SUMMARY OF THE INVENTION

In light of foregoing objects, the present invention provides a plastic battery tray assembly having fewer component parts in which the vacuum reservoir enclosure is molded onto the lower part of the battery tray structure such that the vacuum reservoir enclosure has a common wall with the battery tray. The inventive design of the present battery tray assembly advantageously utilizes material that normally would have been used for the top of the servo speed control reservoir to structurally reinforce the battery tray structure.

Other advantages and meritorious features of the present invention will become more fully understood from the following description of the preferred embodiment, the appended claims, and the drawings.

BRIEF DESCRIPTION OF THE DRAWINGS

FIG. 3 is a perspective view of the speed control servo vacuum reservoir base.

FIG. 4 is a perspective view of the battery tray assembly of the present invention.

FIG. 5 is a cross-sectional view taken along line 5—5 of FIG. 4 showing the structural wall common to the battery tray structure and the vacuum reservoir enclosure.

DETAILED DESCRIPTION OF THE PREFERRED EMBODIMENT

Figure 1:
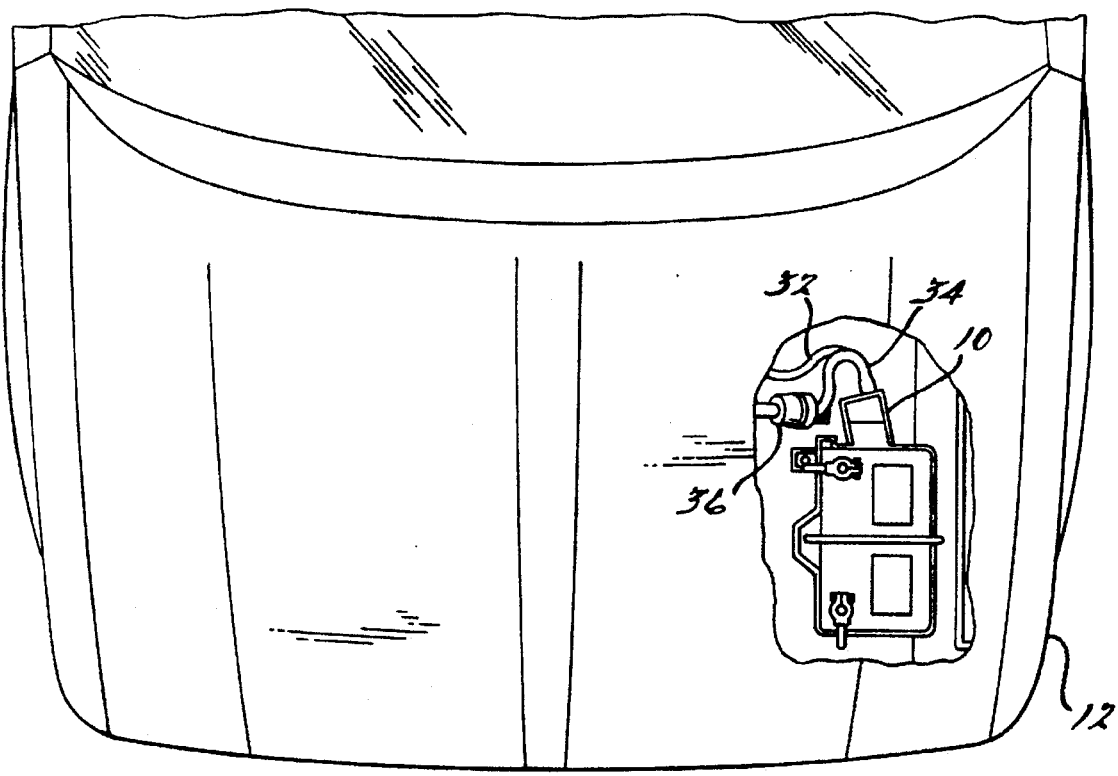
FIG. 1 is a partial plan view with a cut away depicting the battery tray assembly of the present invention mounted in the engine compartment of an automotive vehicle.
Figure 2:
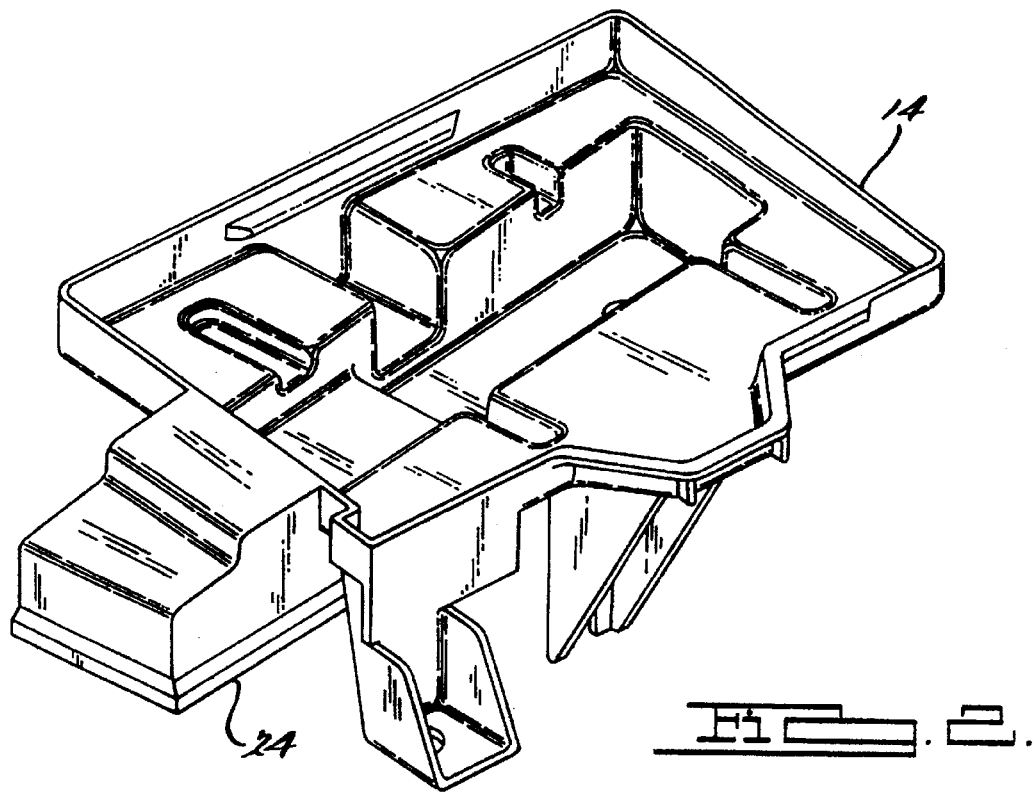
FIG. 2 is a perspective view of the battery tray structure.

Referring now to the drawings wherein like reference numerals represent the same components among the several drawings, FIG. 1 depicts the battery tray assembly 10 of the present invention mounted in an automotive vehicle 12. As seen in FIGS. 2-4, the battery tray assembly 10 is an integrated structure formed of two major components, the battery tray structure 14 shown in FIG. 2 and the speed control servo vacuum reservoir base 16 shown in FIG. 3.

In the preferred embodiment of the present invention, the battery tray structure 14 is made of a coupled glass fiber and mica filled polypropylene thermoplastic. This polypropylene thermoplastic material is filled 40% (37–43%) nominally by weight with a composition of glass and mica having a specific gravity of nominally 1.23 (1.2–1.26). The resulting polypropylene material has excellent stiffness, strength, and dimensional stability.

The vacuum reservoir base 16 is made of glass fiber filled polypropylene thermoplastic. This polypropylene thermoplastic material is filled 30% nominally (27–33%) by weight with a glass homopolymer having a specific gravity of 1.12 (1.09–1.15). The resulting injection-moldable, glass fiber-filled polypropylene homopolymer is suitable for mechanical and underhood applications requiring high strength, rigidity, and resistance to temperatures up to 150° C.

The battery tray structure 12 and the vacuum reservoir base 16 are integrated into the battery tray assembly 10 using a "hot plate" welding process in which the battery tray and reservoir base mating surfaces 24 and 26, respectively, are heated to a molten state and assembled under pressure until the two polypropylene thermoplastic materials cool to form one integrated assemblage having a hermetic seal. The hot plate welding process used to bond the speed control servo vacuum reservoir base 16 to the battery tray structure 14, well known in the art, was performed for Chrysler's preferred embodiment by Molmec, Inc. of Walled Lake, Mich.

Referring now to FIG. 5, a pre-existing structural integrity wall 30 of the battery tray structure 14 is advantageously utilized in the present invention as the top portion of the integrated vacuum reservoir enclosure 28 creating a reinforcing closed-cell cross-section having increased tensile strength over that of simple reinforcing ribs. Thus constructed, the integrated battery tray assembly 10 is stronger than an ordinary plastic battery tray structure without such an integrated vacuum reservoir enclosure 28. In the past, numerous reinforcing ribs were required on the battery tray structure to provide adequate underhood strength and stability. However, the materials and geometry of the present invention provide the needed stiffness, strength, and dimensional stability.

In addition to increased strength, the hot plate welding process which forms the integrated battery tray assembly 10 can be performed, and the assembly 10 can be installed on the vehicle 12, in less time than is required for the assembly and installation of a separate battery tray and speed control servo vacuum bottle combination. Furthermore, less space and fewer fasteners are required for mounting the integrated battery tray assembly 10 on the vehicle 12 than are required for mounting the two separate pieces.

The strength and stiffness of the materials used, and the closed-cell geometry of the present design, also overcome a problem common in prior vacuum bottle reservoir designs wherein such bottles would expand and contract, i.e., "breathe," as a result of elevated underhood operating temperatures. This breathing phenomenon caused a variance in the vacuum created within the bottle which proved troublesome to the operation of the speed control system. In contrast, the strength and stiffness furnished by the materials, and the closed-cell geometry of the present invention, provide the dimensional stability needed to maintain the consistent vacuum reference required by the speed control system despite elevated underhood temperatures.

Figure 6:
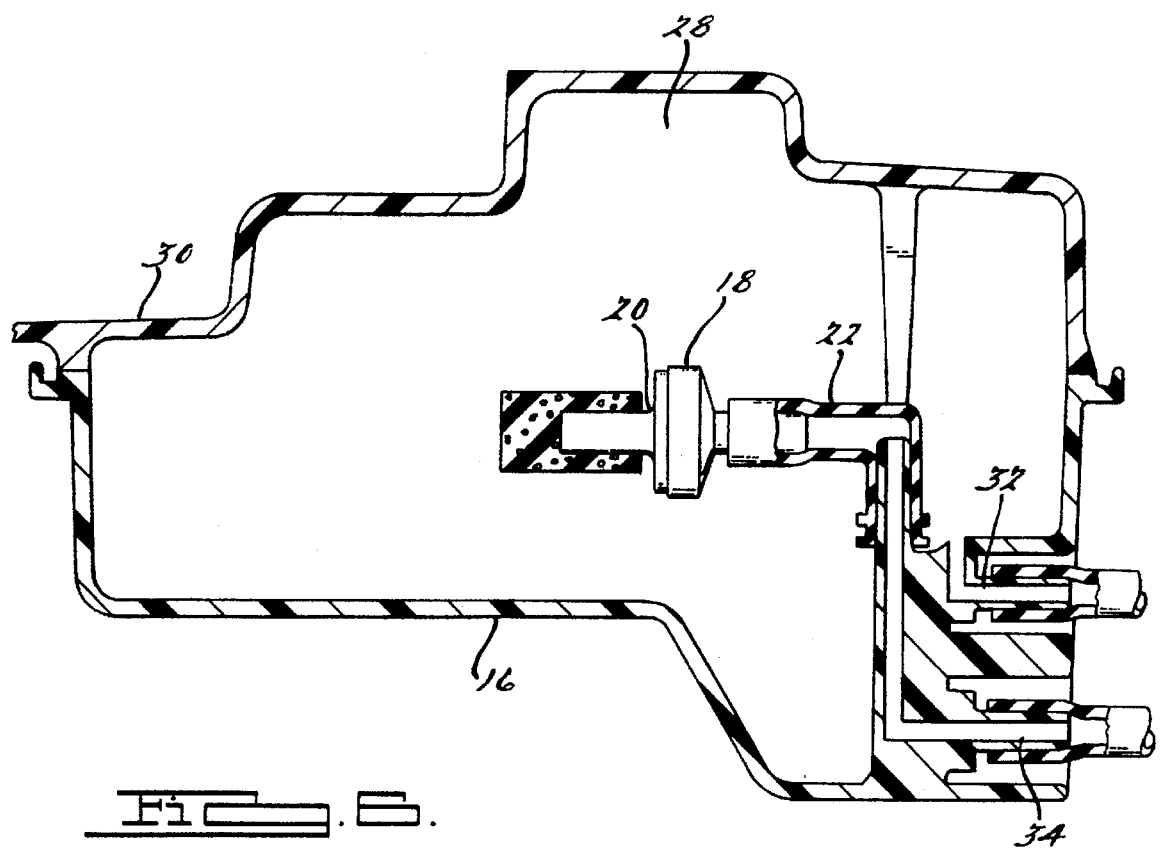
FIG. 6 is a partial cross-sectional view taken along line 6—6 of FIG. 4 showing the speed control vacuum reservoir check valve inside the vacuum reservoir enclosure.

Referring now to FIGS. 1 and 6, the vacuum reservoir base 16 houses a vacuum reservoir check valve 18 having inlet and outlet passages 20 and 22, respectively. The outlet passage 22 of the vacuum reservoir check valve 18 is connected to the intake manifold (not shown) of the engine in the vehicle 12 via a conduit 34. The vacuum reservoir enclosure 20 is connected to the speed control servo valve 36 via a conduit 32. The vacuum created within the vacuum reservoir enclosure 28 by the vehicle engine is used by the speed control system in conjunction with the speed control servo valve 36 to regulate the throttle valve (not shown) such that the vehicle 12 is maintained at a constant speed.

The foregoing detailed description shows that the preferred embodiment of the present invention is well suited to fulfill the objects of the invention. However, it is recognized that those skilled in the art may make various modifications or additions to this preferred embodiment without departing from the spirit of the present invention. For example, the vacuum reservoir check valve 18 could be mounted outside of the vacuum reservoir enclosure 28. Accordingly, one skilled in the art should understand that a variation made to the disclosed embodiment may still properly fall within the scope of the present invention as defined by the claims that follow.

What I claim is:

1. A battery tray assembly for receiving the battery of an automotive vehicle, comprising:

a tray having at least one tray wall composed of a first thermoplastic material and defining a first interior space for receiving said battery, said tray wall having interior and exterior surfaces;

a concave vessel composed of second thermoplastic material, said vessel with at least one vessel wall defining a second interior space and a rim, said vessel attached to said exterior tray wall surface to enclose said second space forming a compartment, said vessel wall having at least two passages; and a one way valve disposed within said vessel, said valve communicating between a first one of said passages and said compartment to maintain a negative pressure within said compartment.

2. The battery tray assembly of claim 1, wherein said first thermoplastic material is a polypropylene thermoplastic material that is filled between 37 to 43 percent by weight with a composition of glass and mica having a specific gravity between 1.2 and 1.26.

3. The battery tray of assembly of claim 1, wherein said second thermoplastic material is a polypropylene thermoplastic material that is filled between 27 to 33 percent by weight with a glass homopolymer having a specific gravity between 1.09 and 1.15.

4. A battery tray assembly for receiving the battery of an automotive vehicle, comprising:

a tray having at least one tray wall composed of a first polypropylene thermoplastic material that is filled between 37 to 43 percent by weight with a composition of glass and mica having a specific gravity between 1.2 and 1.26, said tray wall having an exterior surface and an interior surface, said interior surface defining a first interior space for receiving said battery; and a concave vessel with a vessel wall defining a second interior space and a rim, said vessel composed of a second polypropylene thermoplastic material that is filled between 27 to 33 percent by weight with a glass homopolymer having a specific gravity between 1.09 and 1.15 and attached to said exterior tray wall surface along said rim to enclose said second space and form a compartment.

* * * * *